(12) United States Patent
MacKelvie

(10) Patent No.: US 9,131,665 B2
(45) Date of Patent: Sep. 15, 2015

(54) BIRD FEEDER

(71) Applicant: Winston MacKelvie, Knowlton (CA)

(72) Inventor: Winston MacKelvie, Knowlton (CA)

( * ) Notice: Subject to any disclaimer, the term of this patent is extended or adjusted under 35 U.S.C. 154(b) by 219 days.

(21) Appl. No.: 13/815,578

(22) Filed: Mar. 11, 2013

(65) Prior Publication Data
US 2013/0284100 A1 Oct. 31, 2013

Related U.S. Application Data

(60) Provisional application No. 61/685,402, filed on Mar. 17, 2012.

(51) Int. Cl.
| *A01K 39/01* | (2006.01) |
| *A01K 5/00* | (2006.01) |
| *G01F 11/26* | (2006.01) |
| *A01K 39/012* | (2006.01) |
| *G01F 11/22* | (2006.01) |
| *G01F 11/32* | (2006.01) |

(52) U.S. Cl.
CPC .............. *A01K 39/01* (2013.01); *A01K 39/012* (2013.01); *A01K 39/0113* (2013.01); *G01F 11/22* (2013.01); *G01F 11/261* (2013.01); *G01F 11/32* (2013.01)

(58) Field of Classification Search
CPC ..... A01K 39/012; A01K 39/00; A01K 39/01; G01F 11/261
USPC .............. 119/57.8, 51.01, 57.1, 57.91, 57.92
See application file for complete search history.

(56) References Cited

U.S. PATENT DOCUMENTS

| 2,773,474 | A | * | 12/1956 | Dodds | 119/55 |
| 3,727,584 | A | * | 4/1973 | Permann | 119/56.1 |
| 3,911,867 | A | * | 10/1975 | Berg, Jr. | 119/57.6 |
| 4,055,146 | A | * | 10/1977 | Smrt | 119/51.11 |
| 4,522,152 | A | * | 6/1985 | Meyer | 119/56.1 |
| 4,993,364 | A | * | 2/1991 | Hessenauer | 119/51.11 |
| 5,572,948 | A | * | 11/1996 | Womack | 119/53 |
| 6,659,027 | B1 | * | 12/2003 | Garcia | 111/95 |
| 6,789,503 | B1 | * | 9/2004 | Gao | 119/51.11 |
| 8,336,492 | B1 | * | 12/2012 | Barley et al. | 119/51.04 |
| 8,651,053 | B2 | * | 2/2014 | Reid | 119/51.12 |
| 8,944,006 | B2 | * | 2/2015 | Anderson et al. | 119/51.01 |

* cited by examiner

*Primary Examiner* — Yvonne Abbott-Lewis
(74) *Attorney, Agent, or Firm* — Eric Fincham

(57) ABSTRACT

A tubular bird feeder for seed includes a seed metering valve above the feed holes which may be operated manually, or by a battery powered motor where the battery is charged by a solar cell and the motor responds to a remote control device from the indoors. The perches at the feed holes are made to suddenly buckle when too big of a creature alights thereon. A easy refill procedure uses a swing away cap.

6 Claims, 4 Drawing Sheets

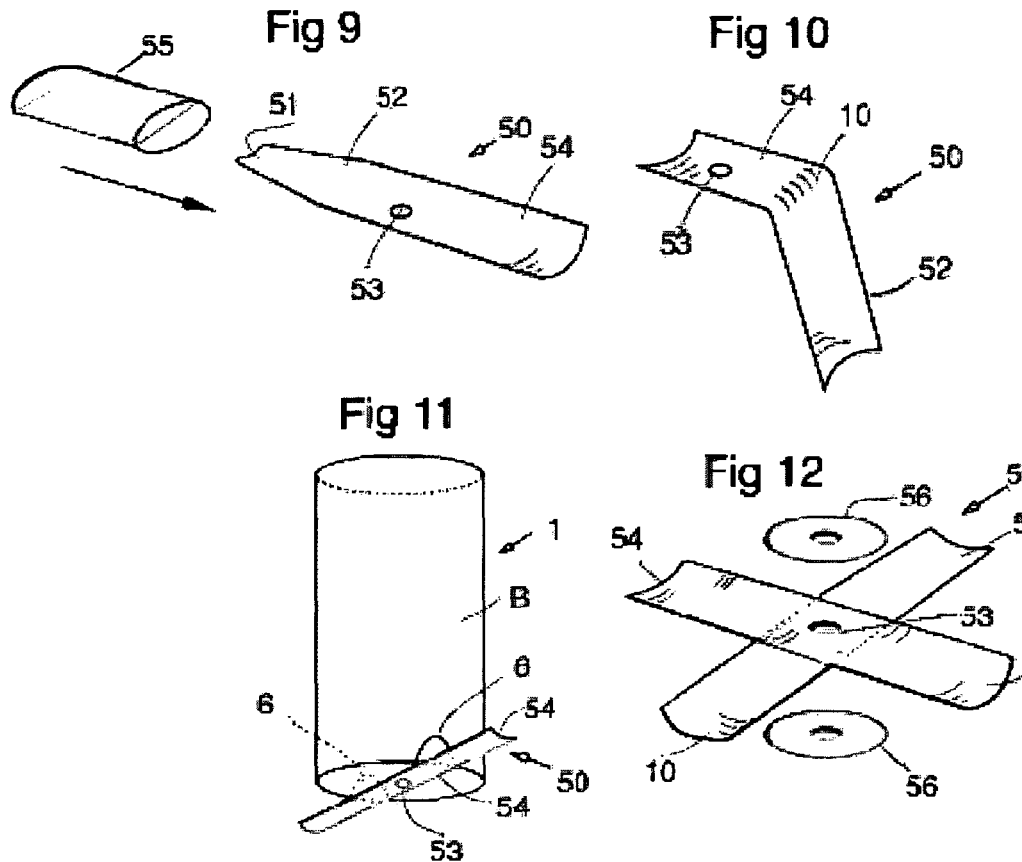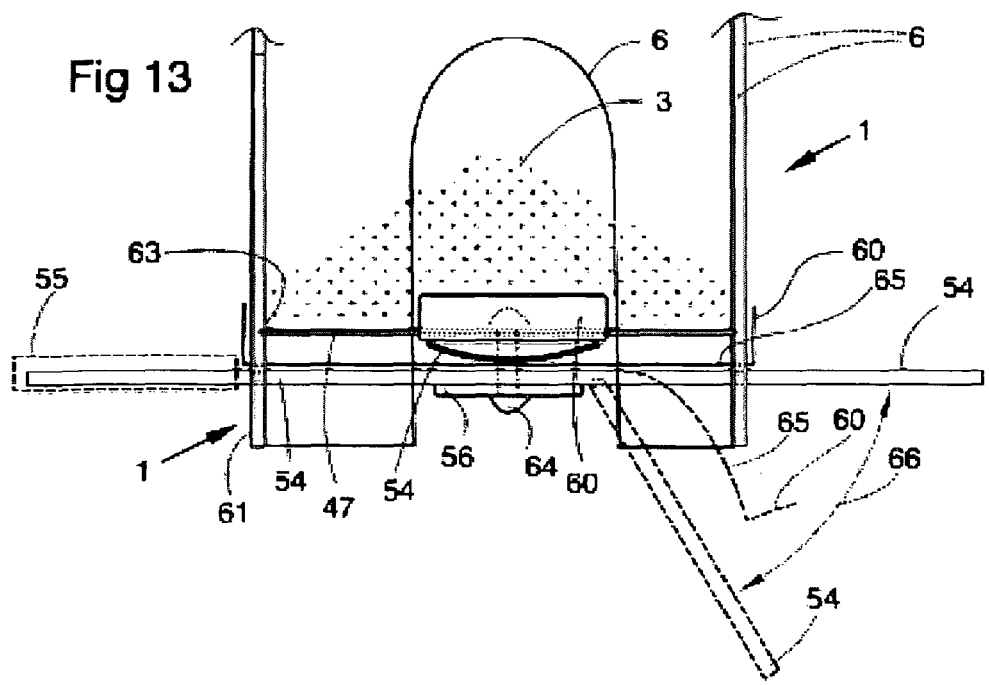

BIRD FEEDER

FIELD OF THE INVENTION

The present invention is in the field of bird feeders.

BACKGROUND OF THE INVENTION

Bird feeders typically supply an unlimited supply of seed, at least until it empties. This upsets the natural diet and activities of the birds so fed. Squirrels and similar rodents are known to gain unwanted and destructive access to the seed. Feeders are often awkward to refill.

SUMMARY OF THE INVENTION

A bird feeder having a seed hopper and a seed metering valve low down in the hopper that can be manually or remotely operated to supply seed to the holes. Perches are made of curved spring strip that is normally straight and stiff but suddenly buckles at a particular point along its length under excessive weigh. This effectively dumps the unwanted creature whereafter the perch returns to straight. The cap is made to hold the total weight and is able to be swung open to gain access for refilling.

BRIEF DESCRIPTION OF THE DRAWINGS

Having thus generally described the invention, reference will be made to the accompanying drawings illustrating an embodiment thereof, in which:

FIG. 9 shows the buckling perch with one end showing how it can be attractively shaped or covered with a tube shape;

FIG. 10 shows the same embodiment of perch with the sharply defined buckle zone;

FIG. 11 shows a bottom view of a bird feeder with a single double-ended perch fitted at the opposing feed holes;

FIG. 12 shows the same embodiment where two perches cross to match a four hole bird feeder and where washers can be used to alter the point of buckle away from the mounting hole;

FIG. 13 shows a close-up of one feed hole and perch including a flimsy plastic strip with end flanges to provide a seed dam at the hole;

DETAILED DESCRIPTION OF THE INVENTION

Figure 1:
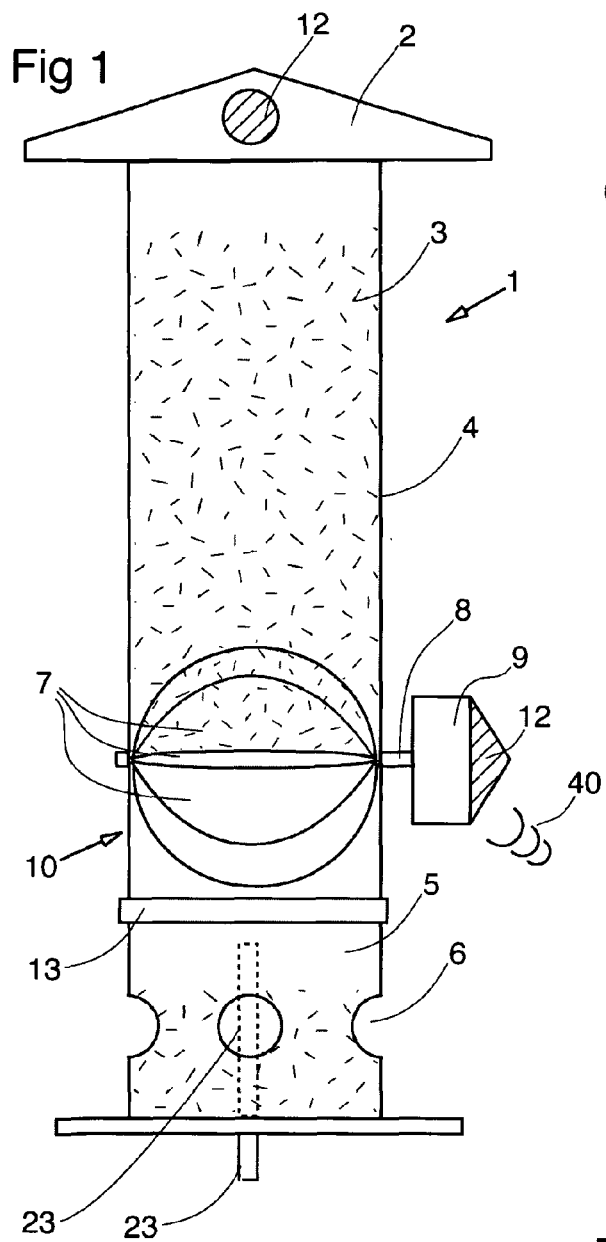
FIG. 1 shows a typical tubular hopper-style bird feeder with upper reservoir portion to hold a supply of seed separated from a lower feeding portion by a seed metering valve.
Figure 2:
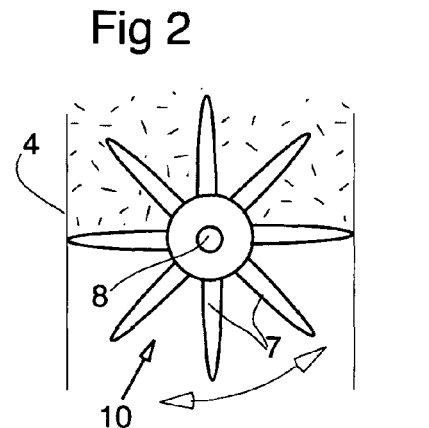
FIG. 2 shows an end view of a seed metering valve with resilient paddles that, when rotated, meters the seed flow in batches into the lower feeding portion, but seals off the seed flow when at rest.

Referring to FIG. 1, bird feeder 1 has a rain/snow cap 2 covering seeds 3. Seed hopper 4, 5 has upper hopper portion 4 filled with seed 3 and lower hopper portion 5 with feed openings 6 for birds to access the seed therein. A rotary seed metering valve 10 has radially spaced paddles 7 that are shaped, arranged and combined so as to form a spherical shape within the cylindrical wall of hopper 4, 5. The outer edges of opposing horizontal paddles seal against the inner circumference of the hopper wall. The up-facing spaces between paddles 7 fill with seed 3 from the upper hopper portion 4. When seed metering valve 10 is rotated, the seed is carried around and falls into the lower hopper portion 5. FIG. 2 shows an end view of the control valve 10 with radially spaced disc-like paddles 7 made of a relatively soft and flexible material to prevent jamming if seeds 3 get trapped between the paddle edges and the hopper wall.

Figure 2B:
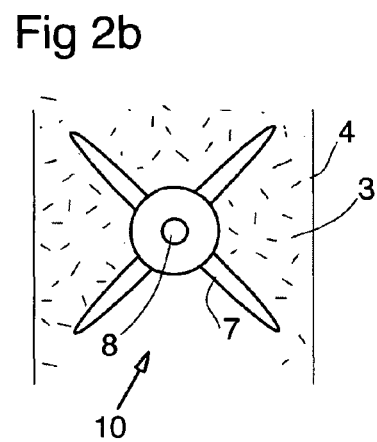
FIG. 2b shows an arrangement of four paddles so that the hopper may be metered or not depending on where the paddles are positioned.

Eight paddles are shown in FIGS. 1, 2 but any number may be used. Four paddles are shown in FIG. 2b so as to offer the instant option of disabling the seed metering by allowing free passage of seed around the non-sealing paddles 7.

Seed metering valve 10 is secured to drive shaft 8 that extends through the hopper with at least one end secured to knob 9 located outside of the hopper. Knob 9 may be a T-handle, a lever, a star wheel or any suitable actuator that can rotate drive shaft 8. Knob 9 also represents a location for solar cell 12. Knob 9 may also serve as an enclosure for an electric drive and signal receiving mechanism, all contained therein (not shown).

Figure 3:
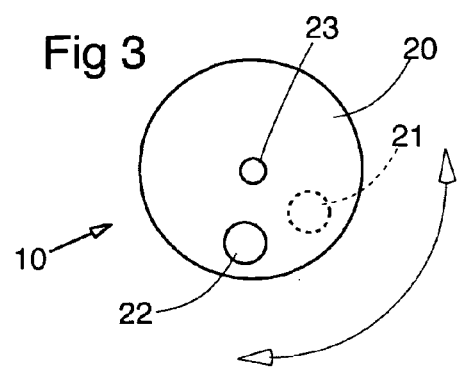
FIG. 3 shows top view of a disc style seed metering valve.
Figure 4:
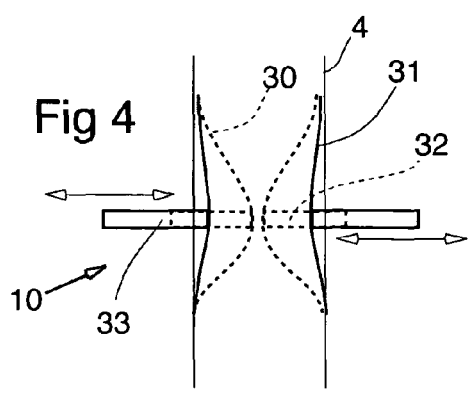
FIG. 4 shows a side view of an elastomeric pinch style seed metering valve.
Figure 5:
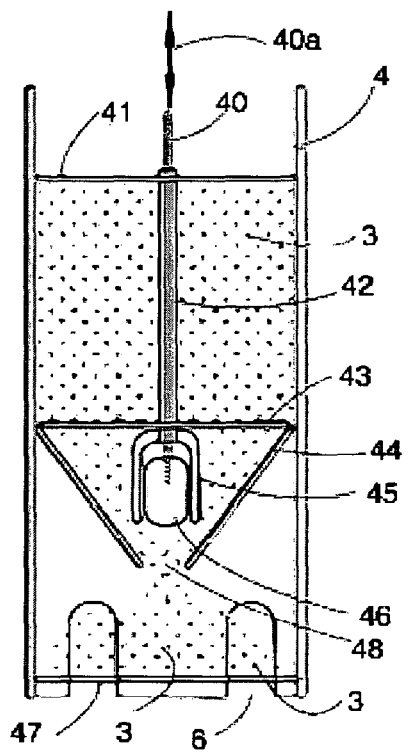
FIG. 5 shows another embodiment where the valve comprises a funnel shape hopper partition having a perforated top plate all suspended from above and enclosing a shroud with a moveable plug therein and where the plug is raised to allow seed to flow.
Figure 6:
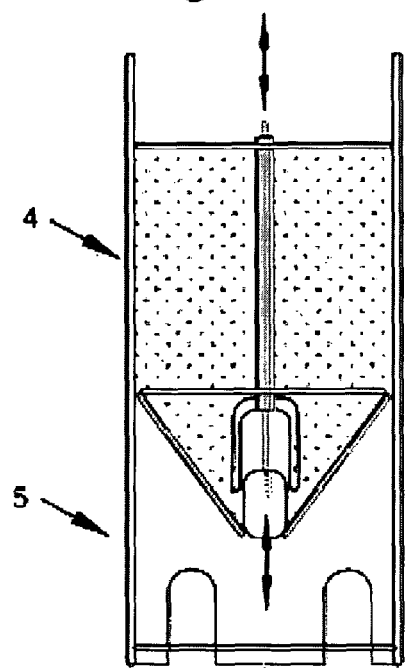
FIG. 6 shows the same embodiment with the plug in the lowered, seed shut-off position.

Other types of solid-control valves can be used such as those shown in FIGS. 3 and 4. FIG. 3 shows a disc valve where two overlaying discs 20 have openings 22, 23 that can be aligned or not by a vertical shaft 23 connected to cap 2 (not shown), or extending below bird feeder 1 as shown in FIG. 3. One rotatable disc may be used whose seed hole is blocked by a hopper-mounted fitting such as a ledge. One stationary disc may be used where the seed hole is blocked by a flat vane that is rotated by shaft 23. The disc(s) effectively separate the upper and lower hopper portions whereby seed can only reach the lower portion through a hole which can be covered or uncovered from outside the hopper.

FIG. 4 shows an elastomeric pinch valve that is a rubbery tube that fits within hopper 4 that can be pinched closed my various means such as rods 32, 33. The pinch valve open position is shown in solid lines 31 while the pinch valve closed position is shown in dashed lines 30. Other forms and types of solid-flow-control valves are known to those skilled in the art and may be used without detracting from the spirit of the invention.

Of course if the hopper is other than tubular, say, for example, rectangular in cross section, then the seed metering valve 10 and paddles 7 would be cylindrical rather than spherical.

A mechanism to operate the seed metering valve 10 may include a solar collector 12 located, for example, on cap 2 or on knob 9, to charge an internal battery (not shown) which can operate the seed metering valve 10 by means of an electric actuator or motor. The solar cell, battery and motor may all be contained within knob 9 (and/or drive shaft 8 and/or meter valve 10) for convenient assembly without visible wires or connections.

A control signal sent from a remote control device in the home may be received by an antenna structure also on knob 9, so as to control bird feeding remotely. Of course standard electric power may be provided from a plug-in source in a building. In FIG. 1 a sound 40 for calling local birds at feed time as the seed metering valve 10 is operated, may also be incorporated in knob 9 as a buzzer or speaker (not shown).

Using the powered version of the instant improved bird feeder 1 makes it possible to program bird feeder 1 to operate in the absence of humans and to provide daily seed at timed intervals when home occupants are ready for a bird show, such as at breakfast.

In FIG. 1 is also shown a joint 13 whereby the upper hopper portion 4 and lower hopper portion 5 of bird feeder 1 may be made (and sold) separately. The joint may be a threaded or a turn-to-lock bayonet connection, or clips, clamps, screws, magnets and like fasteners may be used. In this way, a purchaser can upgrade to a more expensive remote control bird feeder 1 after initial purchase of the less expensive model. Hopper 4 may also be equipped with necessary holes to allow installation of a seed metering valve 10.

Lower hopper portion 5 may include mechanisms for squirrel and other rodents or large bird control that operate independent of the upper hopper portion 4.

Figure 7:
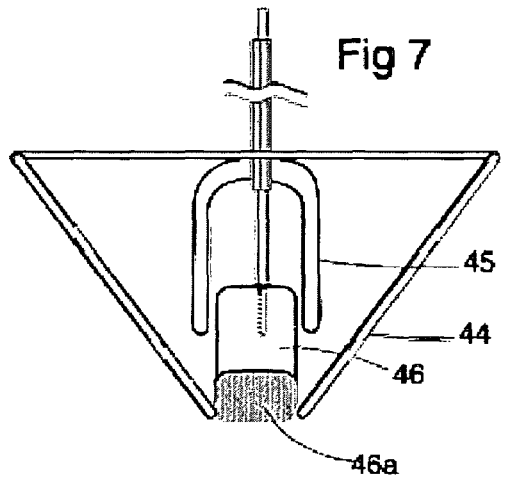
FIG. 7 shows a close-up of the same embodiment with detail showing how the plug may be fitted with flexible bristles to prevent being jammed open by a edge-wise seed or other object.
Figure 8:
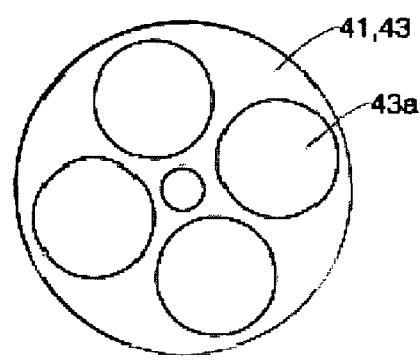
FIG. 8 shows the perforated plate atop the funnel in the same embodiment.
Figure 14:
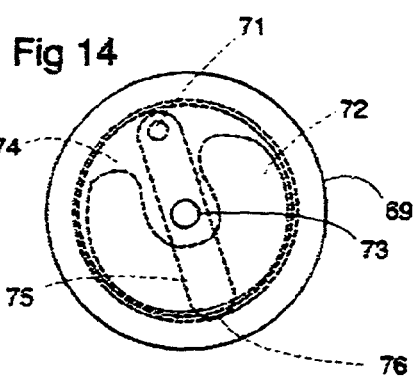
FIG. 14 shows a top view of an embodiment of a swing-cap in place and how the pieces are arranged.
Figure 15:
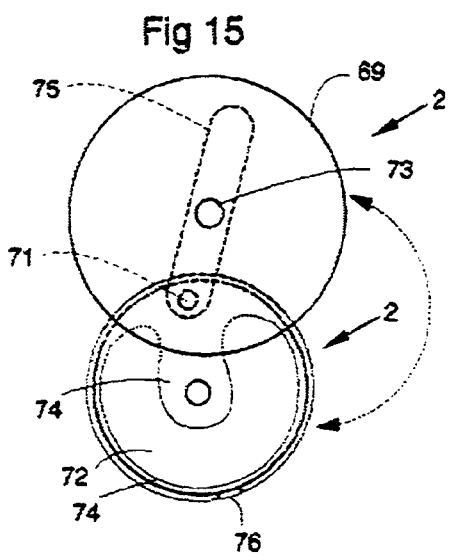
FIG. 15 shows the same embodiment where the cap is swung open to expose the hopper for refill with seed.

FIGS. 5-8 show a preferred valve arrangement where the movement of plug 46 is not encumbered from the weight of seed 3 because it has a stationary shroud 45 in which it is free to slide up and down to open or close passageway 48. This valve arrangement allows for a low power motor to lift the valve for remote operation. FIG. 7 shows how the plug 46 can be terminated or made from, bristles 46a so that plug 46 will seal air passageway 48 even if a seed is otherwise jammed in since the bristles will bend and conform around an obstruction to thereby allow plug 46 to still effectively work. FIG. 8 shows how suspension plates 43 and 43a are perforated with holes 43a to allow seed flow.

FIGS. 9-13 detail the perch 50 which is cut from a convex strip 54 of thin, springy material, such as the spring steel used in a carpenter's retractable tape measure. Being curved or trough-like in cross-section renders it straight and stiff however, as is well known, it can suddenly buckle as shown in FIG. 10 and indicated at bend 10 whereafter it will snap back to its original straight form without kinking or creasing or loosing rigidity or suffering any damage.

The cantilevered outboard portion 51 may be shaped so as to have a tapered end 51 or be capped with a slide-on sleeve 55. Strip 54 can have different specification as to width, length, thickness, and radius of curvature of the convex shape. These variables allow the perch design to have the appropriate stiffness so as to operate as required.

FIG. 11 shows how perch 50 may be installed on a typical bird feeder. Looking up from under the feeder, this embodiment has a central mounting hole 53 by which it is fastened to the feeder bottom. Supporting washers 56 of different diameters may be used effect a longer inboard portion to add stiffness.

FIG. 13 shows the addition of a seed dam 60, 65 placed on top of perch 54 so as to stop seed from unwantedly spraying out from feeding activity in wind or other motion. Seed dam 60, 65 is preferably made of a thin, flexible plastic that will not give purchase to an invading squirrel because it will easily flex out of the way along with perch 54 as shown with dotted lines and curved arrow 66. However the upright flanged end 60 will prevent seed escape. Fastener 64 supports the perches and dams from seed plate 62 which is secured at 63 to bird feeder 1.

Figure 16:
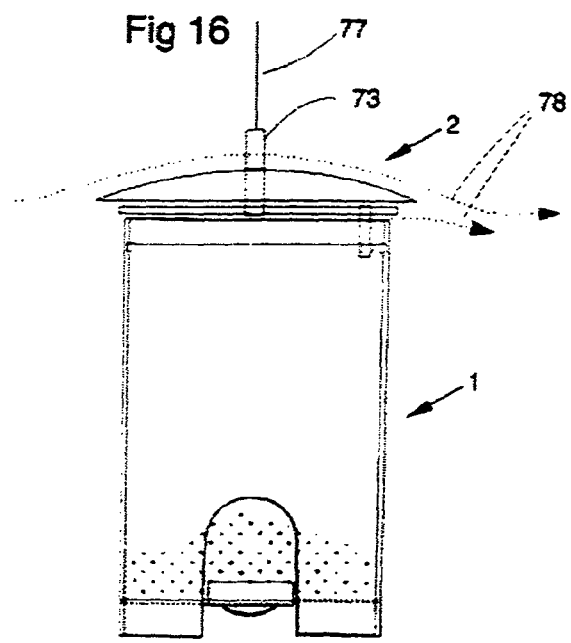
FIG. 16 shows a side view of the same and how it is suspended from above via a chain, cable or the like and how the cap sits on top of the hopper so that any wind will naturally draw air from the hopper to keep the seed dry and safe.
Figure 17:
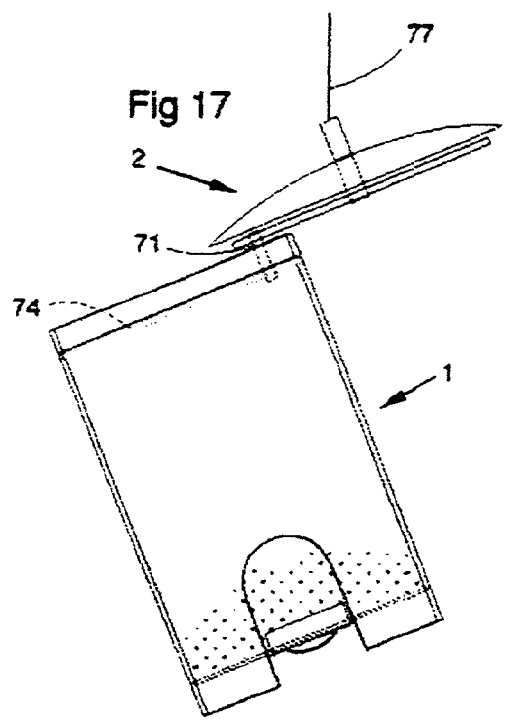
FIG. 17 shows the same embodiment where the cap is swung open and the feeder is slanted from the off-centre weight balance thereby offering ease of refill.

Support plate 74 is secured to feeder 1 and has opening 72 for seed to pass through. and holds pivot 71 about which cap 69 and connector 75 together rotate. Rim of hopper 1 may have an indent or other means to secure connector 75 in place when cap 69 is re-closed. Cap 2 is suspended from cable means 77 at the centre 73 which causes the entire bird feeder to tilt conveniently to ease the seed pour. In FIG. 16 is shown a useful aerodynamic effect where air movements 78 include an exterior flow over the cap which produces a slightly lower pressure below and so causes an air flow from inside the bird feeder which helps to keep seed dry and prevent its unhealthy degradation from wetness.

It will be understood that the above described embodiment is for purposes of illustration only and that changes and modifications may be made thereto without departing from the spirit and scope of the invention.

I claim:

1. A bird feeder comprising:
   a feed tube having a side wall;
   an upper chamber formed in said seed tube, a lower chamber formed in said seed tube, a wall separating said upper chamber and said lower chamber;
   an opening in said wall;
   a movable valve member to open and close said opening;
   said valve member comprising a top, a plurality of bristles extending downwardly from said top; and
   at least one end opening in said side wall of said seed tube to provide access to said lower chamber.

2. The improvement of claim 1 wherein said movable valve member is operated by hand.

3. The improvement of claim 1 wherein said movable valve member is operated by the use of electricity.

4. The improvement of claim 3 wherein said electricity is provided by a solar cell.

5. The improvement of claim 3 wherein said electricity is remotely controlled.

6. The bird feeder of claim 1 further including a shroud for said movable valve member.

* * * * *